US012608265B2

(12) United States Patent
Bunting et al.

(10) Patent No.: US 12,608,265 B2
(45) Date of Patent: Apr. 21, 2026

(54) INTELLIGENT AUTOMATED FORENSIC AGENT

(71) Applicant: Dell Products, L.P., Hopkinton, MA (US)

(72) Inventors: Chris Bunting, Carindale (AU); Raymond Marsh, Auburn, MA (US); Eamonn Farrell, Douglas (IE); Bilicon Patil, Bangalore (IN); Anu Priya, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 18/617,739

(22) Filed: Mar. 27, 2024

(65) Prior Publication Data

US 2025/0307057 A1     Oct. 2, 2025

(51) Int. Cl.
*G06F 11/07* (2006.01)

(52) U.S. Cl.
CPC ........ *G06F 11/079* (2013.01); *G06F 11/0793* (2013.01)

(58) Field of Classification Search
CPC ........................... G06F 11/079; G06F 11/0793
See application file for complete search history.

(56) References Cited

U.S. PATENT DOCUMENTS

| | | | | |
|---|---|---|---|---|
| 10,484,257 | B1* | 11/2019 | Louca | H04L 43/04 |
| 11,075,935 | B2* | 7/2021 | Nides | H04L 63/1425 |
| 11,983,094 | B2* | 5/2024 | Downie | G06F 11/3698 |
| 2006/0112061 | A1* | 5/2006 | Masurkar | G06N 5/04 |
| | | | | 706/47 |
| 2023/0315848 | A1* | 10/2023 | Strogov | G06F 21/577 |
| | | | | 726/24 |
| 2024/0248833 | A1* | 7/2024 | Gupta | G06F 11/0709 |
| 2025/0168056 | A1* | 5/2025 | Lasso | H04L 41/142 |

* cited by examiner

*Primary Examiner* — Jigar P Patel
(74) *Attorney, Agent, or Firm* — Anderson Gorecki LLP

(57) ABSTRACT
An intelligent automated forensic agent continuously monitors a processing system for errors. The intelligent automated forensic agent includes a command script database containing entries correlating error codes with command scripts. Whenever an error is identified on the processing system, the intelligent automated forensic agent determines the type of error, and uses the type of error to determine whether there is an entry for the type of error in the command script database. In response to a determination that the command script database includes an entry for the error type, the intelligent automated forensic agent runs the corresponding commands of the command script to collect whatever data is needed for root cause analysis by any available method. The commands may include searching and saving log records, running commands that shows a configuration setting or state, or executing other pre-existing commands. The collected information is persisted for use in root cause analysis.

16 Claims, 4 Drawing Sheets

FIG. 1

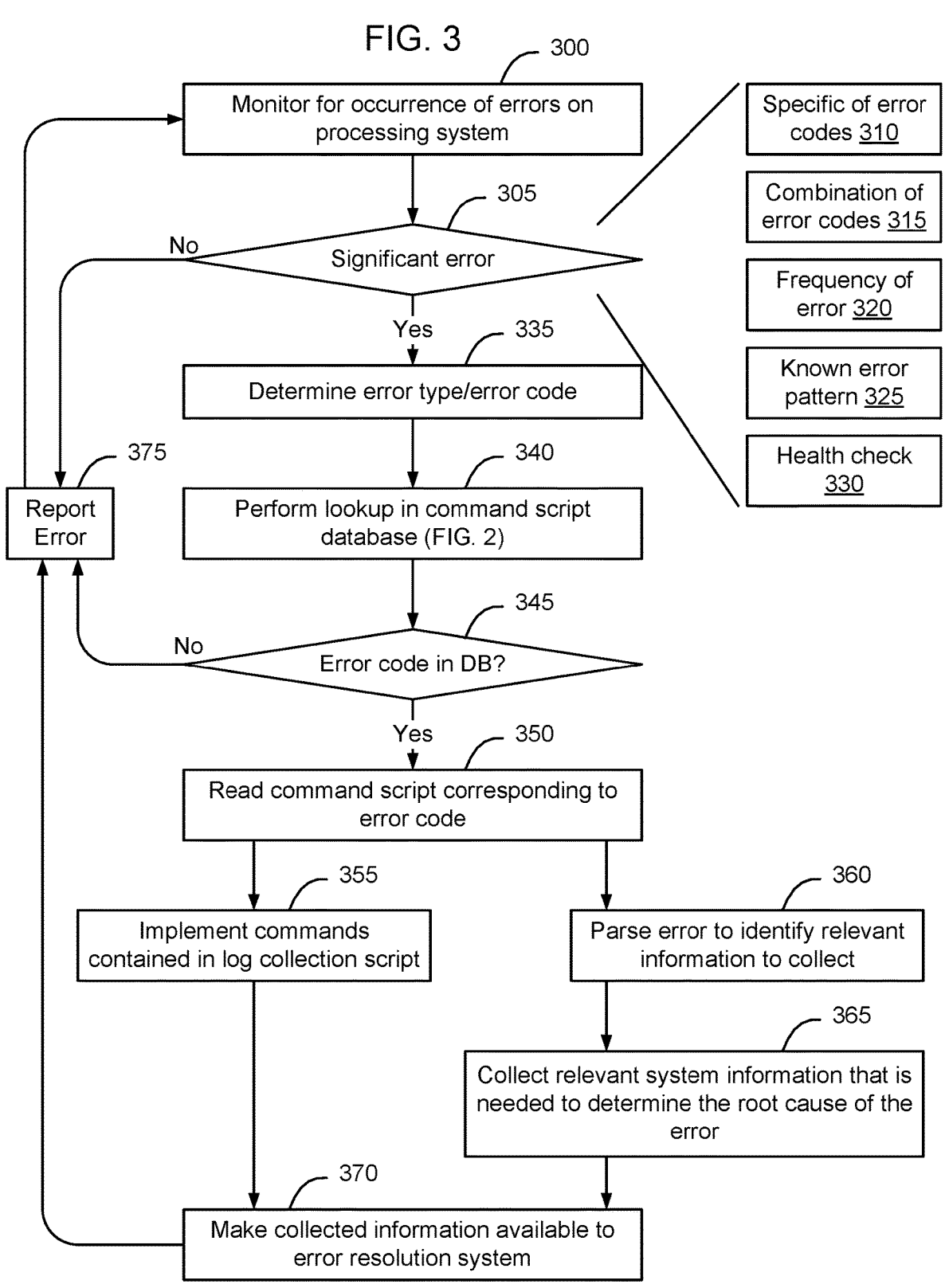

Monitor for occurrence of errors on processing system

Specific of error codes 310

Combination of error codes 315

Frequency of error 320

Known error pattern 325

Health check 330

305

Significant error

No

Yes            335

Determine error type/error code

375

Report Error

340

Perform lookup in command script database (FIG. 2)

345

Error code in DB?

No

Yes            350

Read command script corresponding to error code

355

Implement commands contained in log collection script

360

Parse error to identify relevant information to collect

365

Collect relevant system information that is needed to determine the root cause of the error

370

Make collected information available to error resolution system

INTELLIGENT AUTOMATED FORENSIC AGENT

FIELD

This disclosure relates to computing systems and related devices and methods, and, more particularly, to an intelligent automated forensic agent configured to collect targeted logs and additional system information in response to determination of an error to facilitate root cause analysis of the error.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, an intelligent automated forensic agent is provided that is configured to implement command scripts to collect targeted forensic system information such as targeted logs and additional system information in response to determination of an error to facilitate root cause analysis of the error. As used herein, the term "automated" is used to refer to a process independent of human intervention. According to some embodiments, an intelligent automated forensic agent is provided on a processing system that continuously monitors the processing system for errors. In some embodiments, the intelligent automated forensic agent includes a command script database containing entries correlating error codes with command scripts. Whenever an error is identified on the processing system, the intelligent automated forensic agent determines the type of error and uses the type of error, such as an error code, to determine whether there is an entry for the type of error in the command script database. In response to a determination that there is no entry for the error code, the error may be reported home in a dial-home message but is otherwise ignored by the intelligent automated forensic agent. In response to a determination that the command script database includes an entry for the error code, the intelligent automated forensic agent runs the corresponding command script to implement commands identified in the command script. The collected logs and additional system information collected in connection with implementing the commands of the command script are persisted to make them available for subsequent root cause analysis.

Optionally, if the error is reported to the customer service center using a dial-home message, the location where the collected information is persisted may be included in the dial-home message to facilitate easy access to the persisted information by the customer service engineer.

In some embodiments, a method of collecting targeted information on a processing system in response to determination of an error on the processing system to facilitate root cause analysis of the error includes monitoring the processing system for occurrence of an error and, in response to determining occurrence of the error, implementing a lookup process in a command script database to determine if the command script database contains an entry corresponding to the determined error. In response to a determination that the command script database contains an entry corresponding to the determined error, the method includes reading the entry to determine a set of information collection commands, executing the set of information collection commands of the entry to collect targeted information from the processing system identified in parameters associated with the information collection commands, persisting the collected information in storage, and enabling access to the persisted information in connection with root cause analysis of the error.

In some embodiments, the command script database contains a plurality of entries, each entry being specific to a particular type of error, and each entry including a respective unique set of information collection commands.

In some embodiments, the information collection commands specify collection of output from pre-existing commands, utilities, or functions available on the system. In some embodiments, the method further includes parsing the error to extract information about components affected by or causing the error within the processing system, and using the information about the components affected by or causing the error to extract variables that are used by the information collection commands of the command script to target information that is directly relevant to the error that was logged or otherwise useful for the root cause analysis of the error.

In some embodiments, the method further includes updating the respective set of information collection commands contained in the entry of the command script database after completion of the root cause analysis of the error. In some embodiments, updating the entry includes changing a respective set of commands of the command script to change the information collected in connection with subsequent instances of the error. In some embodiments, updating the entry includes changing a respective set of parameters associated with one or more of the commands of the command script to change the information collected in connection with subsequent instances of the error.

BRIEF DESCRIPTION OF THE DRAWINGS

FIG. 1 is a block diagram of an example processing system including an intelligent automated forensic agent configured to execute command scripts to collect system information in response to determination of errors on a processing system to facilitate root cause analysis of the errors, according to some embodiments.

FIG. 3 is a flow chart of an example process of implementing an intelligent automated forensic agent to execute command scripts in response to determination of errors on a processing system to facilitate root cause analysis of the errors, according to some embodiments.

DETAILED DESCRIPTION

Figure 2:
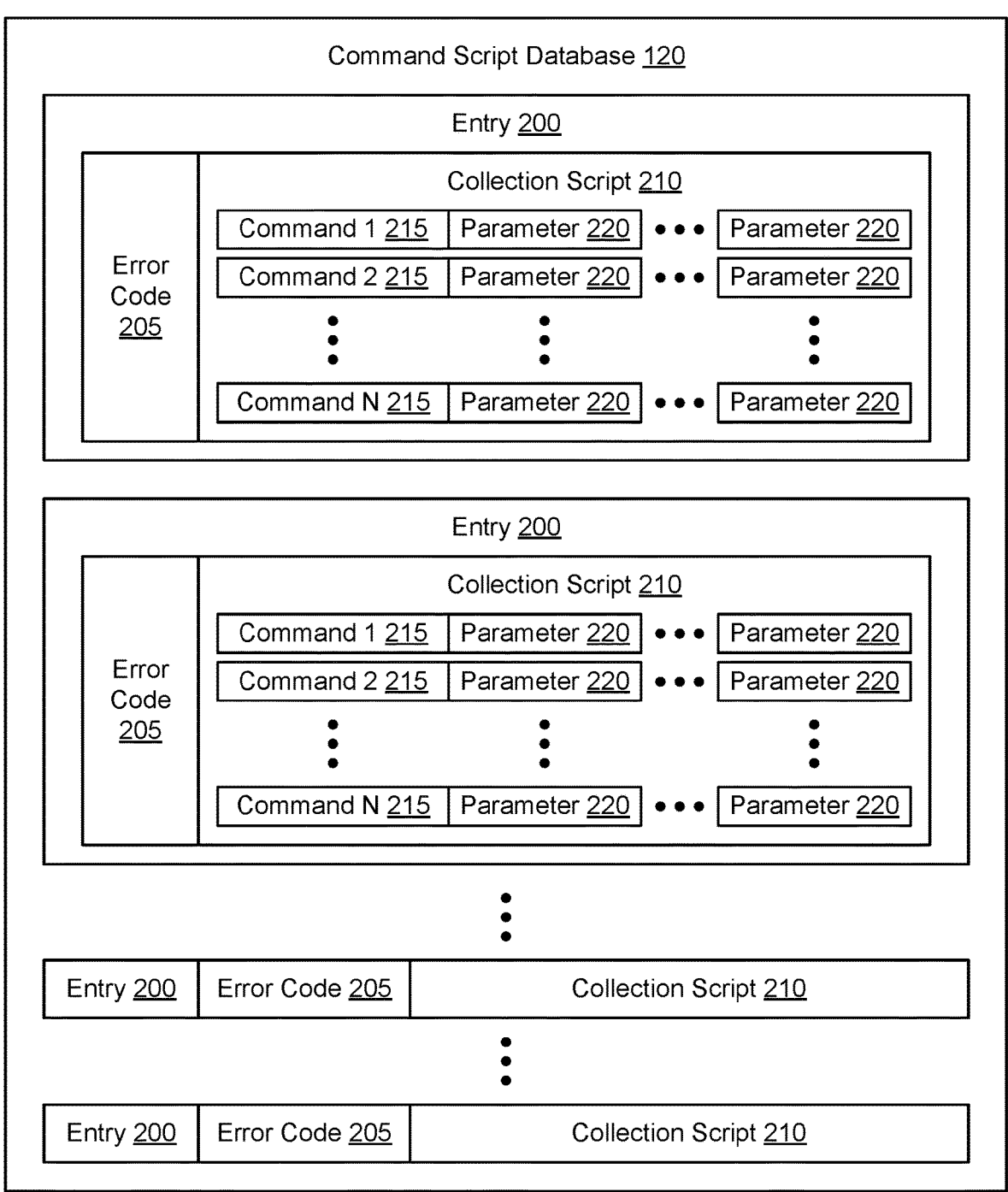
FIG. 2 is a block diagram of an example command script database for use in the intelligent automated forensic agent of FIG. 1, according to some embodiments.

Aspects of the inventive concepts will be described as being implemented in a processing system 190. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or processing system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

When a processing system such as a storage system experiences an error, it is often desirable to perform a root cause analysis to determine what caused the error such that the processing system can be fixed. Customers rely on storage systems to be operable, and often expect 99.9999% availability, which corresponds to approximately 30 seconds of annual downtime. Storage system downtime can be very costly, such that an hour of downtime can cost a customer hundreds of thousands of dollars. Accordingly, it is important to be able to determine the cause of critical errors, to enable the correct decisions to be made as to which remedial actions should be applied to the storage system to prevent recurrence of the error.

One aspect of implementing root cause analysis is to review processing system logs to determine the operational events of various applications and processes at or close to the time of occurrence of the error. A processing system might have hundreds or thousands of processes executing and collaboratively providing access to storage and numerous other functions. As these applications execute, they generate logs identifying operations that were implemented by the various applications on the processing system.

When an error occurs, often the error will be reported back to a customer service center having customer service engineers knowledgeable about the processing system who are trained to resolve processing system errors. In some instances, depending on the activity level at the customer service center, it might take a period of time, such as on the order of minutes or hours, for a customer service engineer to start working on a particular error. Generally, to determine the cause of the error, the customer service engineer will first implement a log collection process to collect logs from the processing system, and then will start to analyze the logs to attempt to determine the likely cause of the error.

Unfortunately, running a log collection process to collect the logs can take a significant amount of time. For example, most vendors have generic data collection scripts that try to capture everything that might be useful for the root cause analysis of any issue. These scripts may collect lots of information that is not relevant to the issue and, at the same time, may not collect the detailed information that is useful for the particular problem that has occurred, which requires running very targeted commands. When logs are available it can take weeks to work through the logs to perform root cause analysis and arrive at a solution as to why the error occurred. Further, initiating collection of information at a later point in time can result in a situation where some of the relevant additional system information that is not captured in the logs, such as elements of the system state, no longer exist.

In some situations, some additional information that is not captured in the logs, such as system state, that may be needed to successfully complete root cause analysis when an error occurs only exists for a very short duration. For example, if a host initiates a write operation on a processing system and the write operation fails, the host may replay the host write operation immediately after the initial failure. When the subsequent host write operation is successful, the system state associated with the initial failed host write operation may be lost. All of this may take on the order of 1 millisecond. However, if there are multiple host write failures, and an engineer would like to perform a root cause analysis to determine why host write operations are failing on the processing system, it can be difficult to successfully complete this root cause analysis since the additional information that is not captured in the logs, such as the error state associated with the failed write 10 operations, will not be available. In instances when the system state is not available, it may take much longer to successfully complete root cause analysis, for example by requiring the customer service engineer to attempt to recreate the error on the processing system. This lack of ability to successfully complete root cause analysis impacts the overall total customer experience, and increases the amount of time and cost associated with determining actions that should be taken to correct the processing system to prevent future failures.

According to some embodiments, an intelligent forensic agent 275 is provided on the processing system 190 that continuously monitors the processing system 190 for errors. In some embodiments, the intelligent forensic agent 275 collects forensic evidence about the system when an error occurs. The forensic evidence is collected using one or more sets of commands, referred to herein as scripts. The command scripts instruct the intelligent forensic agent 275 what commands should be executed to collect targeted information from the system that will be needed to determine the root cause of the error. In some embodiments the scripts contain commands that are targeted to collect information such as logs, system state, and other information specified in parameters correlated to the commands, that enable the commands to specifically target parts of the system based on the type of error and the affected set of components in the processing system 190. For example, in response to a write error, the intelligent forensic agent 275 may parse the write error to determine the affected set of components associated with the write error and run a write error command script to collect information about the particular device, track, and cache slot that logged the error.

In some embodiments, the intelligent forensic agent 275 includes a command script database 120 containing entries correlating error codes with command scripts. Whenever an error is identified on the processing system, the intelligent forensic agent 275 determines the type of error and uses the type of error, such as an error code, to determine whether there is an entry for the type of error in the command script database 120. In response to a determination that there is no entry for the error code, the error is managed by the dial-home error reporting system 125 which may generate a dial-home message if the error is sufficiently serious. In response to a determination that the command script database 120 includes an entry for the error code, the intelligent forensic agent 275 runs the corresponding command script to execute the commands contained in the command script to collect information from the system associated with the error. The script can take input such as the device, track, slot, etc., that are extracted from the error log, so that the collection is targeted at the components that may have caused the error. The collected information is persisted and made available for root cause analysis.

Optionally, if the error is reported to the centralized error resolution system 150 using a dial-home message, the location where the collected information is persisted may be included in the dial-home message to facilitate easy access to the persisted information by the customer service engineer.

Figure 1:
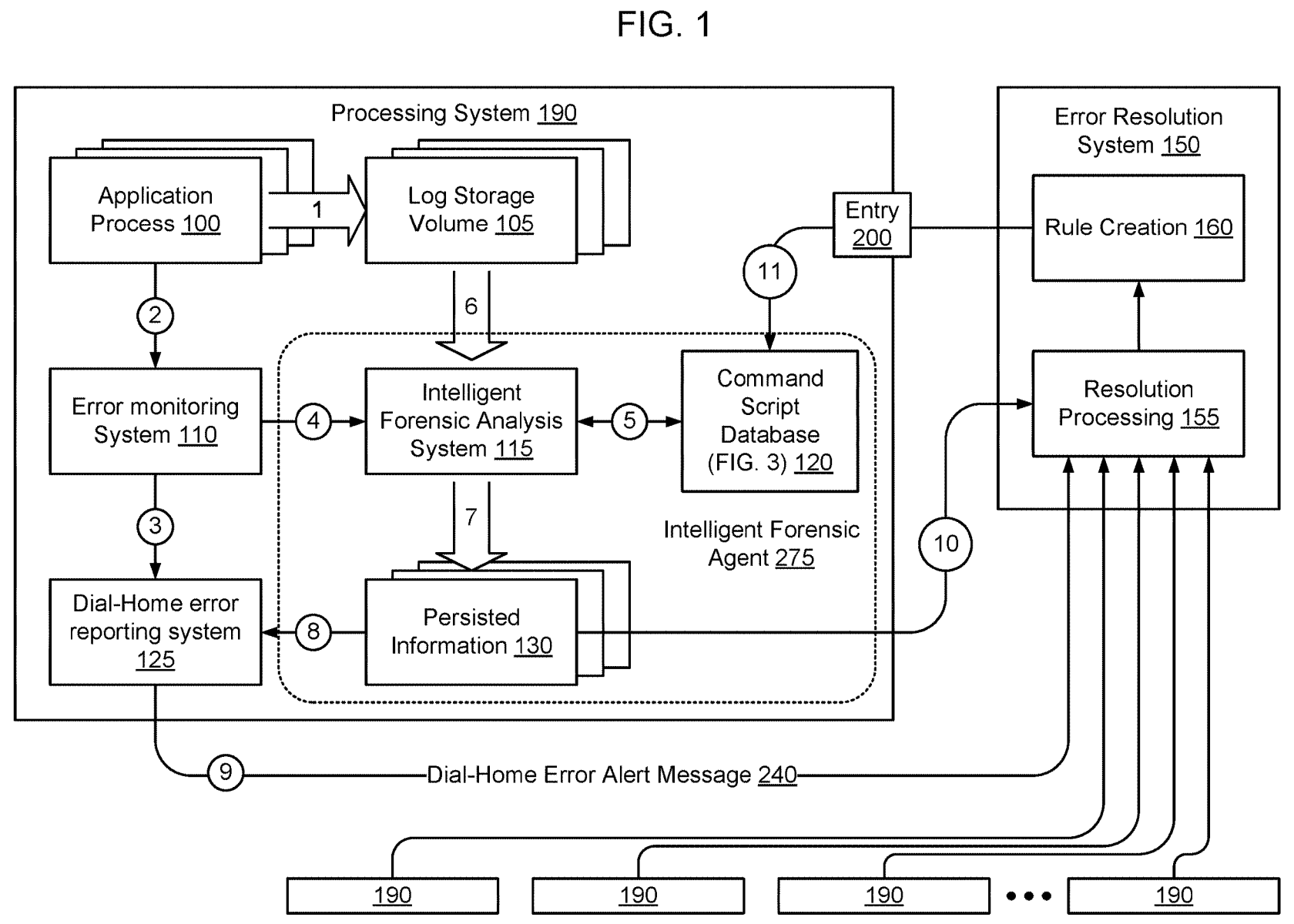

FIG. 1 is a block diagram of an example processing system 190 including an intelligent automated forensic agent 275 configured to execute command scripts to collect system information in response to determination of occurrence of errors to facilitate root cause analysis of the errors, according to some embodiments. As shown in FIG. 1, in some embodiments a processing system 190 will have hundreds or thousands of application processes 100 executing and using resources of the processing system 190. As the applications execute, the applications generate logs (arrow 1) which are stored in log storage volumes 105. The applications will also generate system state which may be transitory and not included in the log storage volumes 205.

When an error occurs, there is often a small window of opportunity for collecting information about the error, such as the system or component state. Likewise, depending on the size of the log, the window of opportunity for collecting logs associated with the error may be on the order of minutes, hours, or days. After that time, the data may be lost because the logs have wrapped (been overwritten by subsequent logs). System state, by contrast, may change quickly and should be collected immediately or risk being lost and no longer able to be retrieved. Further, when an error occurs, any data that is collected must be targeted, because it is practically impossible to collect detailed information about every element in the system. For example, in response to a data loss on a single sector of a disk, it would be preferable to collect detailed information about the sector with the data loss, rather than collecting detailed information about every sector on the disk or about every disk in the processing system 190.

According to some embodiments, the processing system 190 includes an error monitoring system 110. Errors generated by applications 200 (arrow 2) are received by the error monitoring system 110. Significant errors detected by the error monitoring system 110 are passed to a dial-home error reporting system 125 (arrow 3) which generates and transmits dial-home error alert messages 240 to a customer support error resolution system 150 (arrow 9). In addition, the error monitoring system 110 provides detected errors (arrow 4) to an intelligent forensic agent 275 that includes an intelligent forensic analysis system 115 that analyzes the errors, combinations of error codes, and frequencies of the occurrence of errors against known error patterns to identify occurrence of significant errors on the processing system 190. In some embodiments, when a possible significant error is detected, the intelligent forensic analysis system 115 uses the error type to implement a lookup operation in a command script database 120 (arrow 5) to determine if there is a log collection entry for the determined error. In response to a determination that the command script database 120 contains an entry for the identified error, the intelligent forensic analysis system 115 executes the commands contained in the collection script of the entry to collect the data required by the command script, for example from log storage 105 (arrow 6), and persists a copy of the collected data in storage 130 (arrow 7). The persisted information is either provided to the dial-home error reporting system 125 (arrow 8) and the location of the persisted information in storage 130 is made available in the dial-home error alert message 240, or the persisted information may be made directly available to the error resolution system 150 (arrow 10). As errors are resolved by customer service engineers at the error resolution system 150, the entries 200 of the command script database 120 are created and updated using rule creation subsystem 160 (arrow 11).

FIG. 2 is a block diagram of an example command script database 120 for use in the intelligent automated forensic agent 275 of FIG. 1, according to some embodiments. As shown in FIG. 2, in some embodiments the command script database 120 includes entries 200 that are created, for example by experienced customer service engineering and customer service organizations to train the intelligent forensic analysis system 115 to look for particular errors, and combinations of errors reported by the error monitoring system 110 (arrow 4). In some embodiments, each entry 200 includes an error code 205 and a command script 210. The command script 210, in some embodiments, includes a list of commands 215 that should be executed and an associated set of parameters to configure the commands to collect whatever data is needed for root cause analysis by any available method. Example commands might include, for example, searching and saving log records, running a command that shows a configuration setting of the processing system, collecting particular aspects of system state associated with particular components associated with the error, or any other pre-existing commands that would normally be run by an expert user if the expert user was investigating a problem in real time. For example, in some embodiments the commands might include commands to capture the value of particular registers, values of particular application variables, or other indicators that may be used to discern the state of the processing system 190 or state of one or more of the application processes 100 at or close to the time of occurrence of the error. The commands may also take parameters extracted from the error that is logged to determine an affected set of components within the processing system 190 and use the information extracted from the error to determine information to be collected by the commands contained in the script. For example, in the case of a write error, the commands may take parameters from the write error, such as the device, cylinder, head, port, etc., that was associated with the error to enable the commands to collect system state and other information associated with the error that is specifically tailored to be relevant to the error that occurred in the system.

FIG. 3 is a flow chart of an example process of implementing an intelligent automated forensic agent to execute command scripts in response to determination of errors on a processing system to facilitate root cause analysis of the errors, according to some embodiments. As shown in FIG. 3, in some embodiments the intelligent forensic analysis system 115 monitors the output of the error monitoring system 110 for occurrence of errors on the processing system (block 300) and analyzes the output of the error monitoring system 110 to identify significant errors (block 305). In response to a determination that an error has occurred, but that the error is not a significant error (a determination of NO at block 305), in some embodiments the error is reported (block 375) and the process ends. In some embodiments, the forensic analysis system 115 determines the occurrence of a significant error (a determination of YES at block 305) based on the identification of specific error codes (block 310), combinations of error codes (block 315), the frequency of occurrence of particular errors (block 320), and known error patterns (block 325). The forensic analysis system 115 may also perform health checks (block 330) either periodically or in response to identification of one or more of the other error indicators (blocks 310-325) to determine or confirm the occurrence of a particular significant error.

When a significant error is identified (a determination of YES at block 305), the intelligent forensic analysis system 115 determines the error type/error code (block 335) and uses the error type/error code to perform a lookup in the command script database 120 (block 340). In some instances, the command script database 120 does not include entries for every type of error and, accordingly, in some instances in response to performing a lookup in the command script database 120, the intelligent forensic analysis system 115 will determine that there is no entry corresponding to the determined error (a determination of NO at block 335). Optionally, since the intelligent forensic agent 275 operates independent of the dial-home error reporting system 125, the dial-home error reporting system 125 may separately generate a dial-home error alert message (block 375).

In some instances, the command script database 120 will contain an entry for the identified error type/error code (a determination of YES at block 335). Accordingly, the intelligent forensic analysis system 115 will retrieve the entry 200 from the command script database 120 and read the command script 210 from the entry 200 (block 350). Based on the command script 210, the intelligent forensic analysis system 115 reads the commands identified in the command script 210 and runs the commands to collect any identified information specified by the set of corresponding parameters (block 355). The information collected by the intelligent forensic analysis system 115 is persisted in storage 130 and made available to the error resolution system 150 (block 370). In some embodiments, the location of the persisted information in storage 130 is communicated as part of the dial-home error alert message 240 (block 375).

Figure 4:
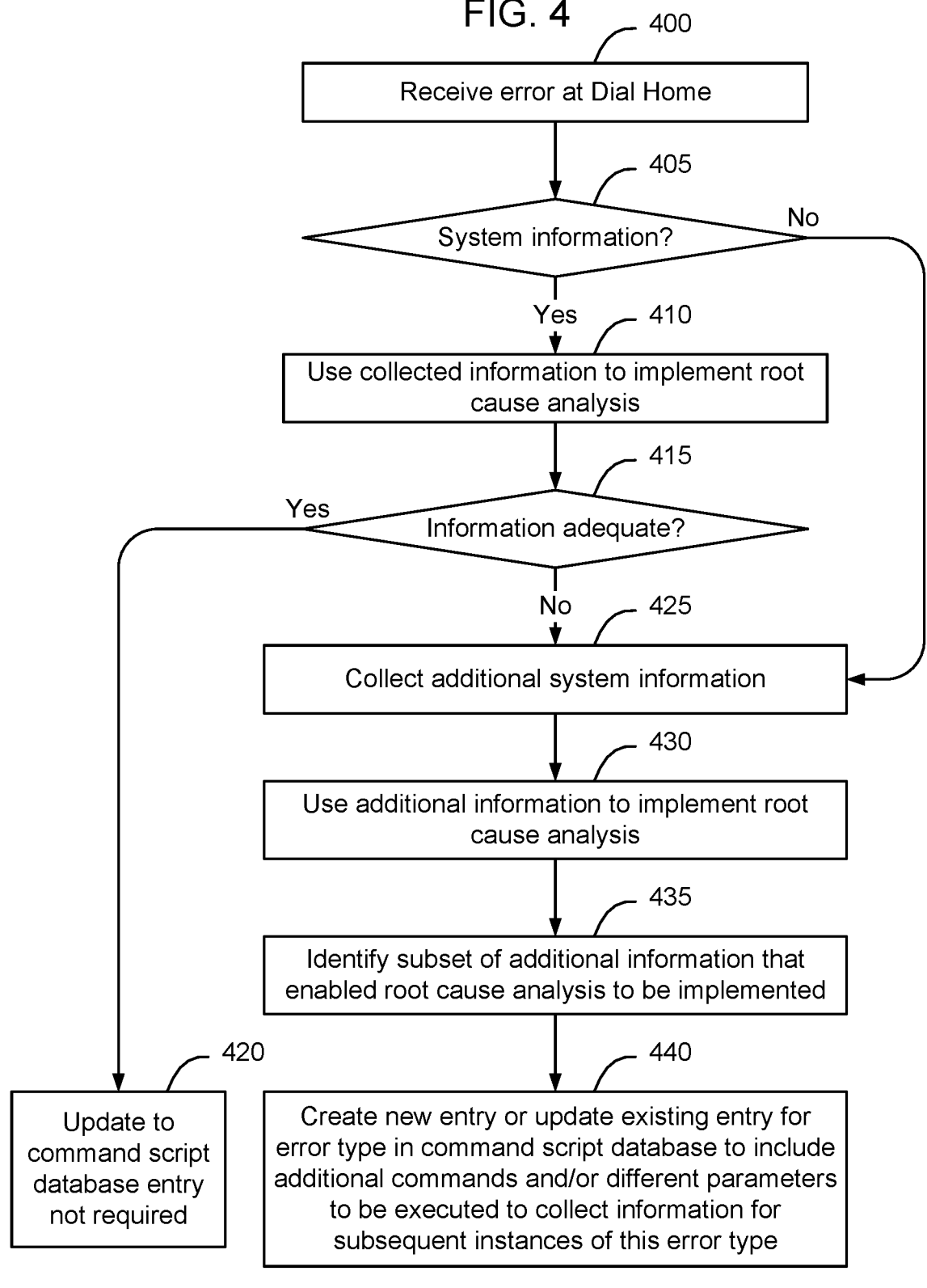
FIG. 4 is a flow chart of an example process of creating and evolving entries of the command script database to enable the scripts implemented in response to occurrence of errors to change over time, according to some embodiments.

FIG. 4 is a flow chart of an example process of creating and evolving entries of the command script database 120 to enable scripts implemented in response to occurrence of errors to change over time, according to some embodiments. As shown in FIG. 4, when a dial-home error alert message 240 is received (block 400) a determination is made as to whether a command script 210 was used by the intelligent forensic analysis system 115 (block 405) to collect information in response to occurrence of the error when the error occurred on the processing system.

In response to a determination that a command script 210 was implemented by the intelligent forensic analysis system 115 (a determination of YES at block 405), the persisted information is retrieved from storage 130 and used by resolution processing system 155 of error resolution system 150 to perform root cause analysis (block 410). During the process of performing root cause analysis, a determination is made as to whether the information that was collected by running the command script 210 was adequate (block 415). If the information was adequate to successfully complete root cause analysis (a determination of YES at block 415), it is not necessary to update the entry 200 in the command script database 120 (block 420).

In response to a determination that the information was inadequate to successfully complete root cause analysis (a determination of NO at block 415), or in response to a determination that a command script 210 was not implemented by the intelligent forensic analysis system 115 (a determination of NO at block 405), the customer service engineer may collect some additional information manually (block 425) in order to perform root cause analysis (block 430). As a result of this process, a command script may be created for the error or the existing command script may be updated to include additional commands and corresponding parameters identifying information that should be collected in connection with subsequent errors of this error type (block 435). Accordingly, to enable this information to be captured (in the future), a new entry 200 is created or an existing entry 200 is updated in the command script database 120 to include a subset of additional commands and corresponding parameters to be executed in connection with subsequent instances of this type of error (block 440). By enabling existing entries to be updated and new entries to be created, it is possible to cause the scripts to evolve over time.

Previously, when a critical error would occur on a processing system, the system would log the error and send a report back to customer service in the form of a dial-home error alert message. A case would be created and put in a queue at the error resolution system 150. Alternatively, if a customer noticed a problem with a particular processing system, the customer could manually open a case at the error resolution system 150. Once the case was selected from the queue for resolution, which might be hours after the case was added to the queue, a customer service expert would review the case, establish a remote connection to the processing system, and begin investigation of what caused the problem. The customer service expert would then attempt to implement system repair, which might take a significant amount of time and may be hampered if some of the needed information, such as the logs or system state, was no longer available. Often when the customer service expert began work on the error, a general data collection process would be initiated, which could itself take a period of time and might result in collection of multiple gigabytes of log data that would need to be evaluated, and often some of the detailed data that was needed for root cause analysis would still be missing. An attempt to collect the missing data may be implemented but ultimately, if the data has been deleted or the space reused, the data may no longer be available.

By providing an intelligent forensic analysis system 115 that is trained to look for occurrence of particular types of errors and error patterns, and implement error specific command scripts 210 in response to determination of the occurrence of particular types of errors and error patterns, it is possible to run targeted information collection commands that are designed to collect targeted information that will be subsequently be required to successfully complete root cause analysis. Accordingly, the fact that a case might not be immediately selected from a queue at the error resolution system 150 does not prevent root cause analysis from being successfully completed due to loss of information.

By enabling entries 200 of the command script database 120 to be created by customer service experts, and basing the intelligence of the intelligent forensic analysis system 115 on this experience, it is possible to capture the organizational knowledge that has accumulated in connection with resolving previous customer issues and use that knowledge to train the intelligent forensic analysis system 115. By continuously monitoring the state of the processing system 190, and when an error or event of significance is detected, automating the collection of forensic data that is likely to be needed to understand the root cause of the error or event, it is possible to autonomously collect the right amount of data at the right time. This enables the data that will be required to resolve customer problems and perform root cause analysis to be persisted and, hence, made available at a subsequent point in time. Thus, the intelligent forensic analysis system 115 enables root cause analysis to be successfully completed in situations where it currently is not possible due to occasion of lost data.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of collecting targeted information on a processing system in response to determination of an error on the processing system to facilitate root cause analysis of the error, the method comprising:

monitoring the processing system for occurrence of errors, by an error monitoring system;

providing the errors by the error monitoring system to a forensic agent that includes a forensic analysis system;

analyzing the errors, combinations of error codes, and frequencies of the occurrence of errors, by the forensic analysis system, against known error patterns to identify occurrence of a significant error in the processing system;

in response to determining occurrence of the significant error, implementing a lookup process, by the forensic analysis system, in a command script database to determine if the command script database contains an entry corresponding to the determined significant error;

in response to a determination that the command script database contains an entry corresponding to the determined significant error, reading the entry by the forensic analysis system to retrieve a set of information collection commands to be executed in response to occurrence of the error;

automatically executing the retrieved set of information collection commands of the entry by the forensic analysis system to collect targeted information from the processing system in response to the determination of the significant error on the processing system, the targeted information being identified in parameters associated with the information collection commands;

persisting the collected targeted information by the forensic analysis system in storage; and enabling access to the persisted information in connection with root cause analysis of the determined significant error.

2. The method of claim 1, wherein the command script database contains a plurality of entries, each entry being specific to a particular type of error, and each entry including a respective unique set of information collection commands.

3. The method of claim 1, wherein the information collection commands specify collection of output from pre-existing commands, utilities, or functions available on the system.

4. The method of claim 3, further comprising parsing the significant error to extract information about components affected by or causing the significant error within the processing system, and using the information about the components affected by or causing the significant error to extract the parameters that are used by the information collection commands.

5. The method of claim 1, further comprising updating the respective set of information collection commands contained in the entry of the command script database after completion of the root cause analysis of the significant error.

6. The method of claim 5, wherein updating the entry comprises changing a respective set of commands of the command script to change the information collected in connection with subsequent instances of the significant error.

7. The method of claim 5, wherein updating the entry comprises changing a respective set of parameters associated with one or more of the commands of the command script to change the information collected in connection with subsequent instances of the significant error.

8. The method of claim 1, further comprising:

in response to a determination that the command script database does not contain an entry corresponding to the determined significant error, generating a dial home message or doing nothing depending on a severity of the determined significant error.

9. A system for collecting targeted information on a processing system in response to determination of an error on the processing system to facilitate root cause analysis of the error, comprising:

one or more processors and one or more storage devices storing instructions that are operable, when executed by the one or more processors, to cause the one or more processors to perform operations comprising:

monitoring the processing system for occurrence of errors, by an error monitoring system;

providing the errors by the error monitoring system to a forensic agent that includes a forensic analysis system;

analyzing the errors, combinations of error codes, and frequencies of the occurrence of errors, by the forensic analysis system, against known error patterns to identify occurrence of a significant error in the processing system;

in response to determining occurrence of the significant error, implementing a lookup process, by the forensic analysis system, in a command script database to determine if the command script database contains an entry corresponding to the determined significant error;

in response to a determination that the command script database contains an entry corresponding to the determined significant error, reading the entry by the forensic analysis system to retrieve a set of information collection commands to be executed in response to occurrence of the error;

automatically executing the retrieved set of information collection commands of the entry by the forensic analysis system to collect targeted information from the processing system in response to the determination of the significant error on the processing system, the targeted information being identified in parameters associated with the information collection commands;

persisting the collected targeted information by the forensic analysis system in storage; and enabling access to the persisted information in connection with root cause analysis of the determined significant error.

10. The system of claim 9, wherein the command script database contains a plurality of entries, each entry being specific to a particular type of error, and each entry including a respective unique set of information collection commands.

11. The system of claim 9, wherein the information collection commands specify collection of output from pre-existing commands, utilities, or functions available on the system.

12. The system of claim 11, further comprising parsing the significant error to extract information about components affected by or causing the significant error within the processing system, and using the information about the components affected by or causing the significant error to extract the parameters that are used by the information collection commands.

13. The system of claim 9, further comprising updating the respective set of information collection commands contained in the entry of the command script database after completion of the root cause analysis of the significant error.

14. The system of claim 13, wherein updating the entry comprises changing a respective set of commands of the command script to change the information collected in connection with subsequent instances of the significant error.

15. The system of claim 13, wherein updating the entry comprises changing a respective set of parameters associated with one or more of the commands of the command script to change the information collected in connection with subsequent instances of the significant error.

16. The system of claim 9, the operations further comprising:

in response to a determination that the command script database does not contain an entry corresponding to the determined significant error, generating a dial home message or doing nothing depending on a severity of the determined significant error.

\* \* \* \* \*